United States Patent [19]
Zielske

[11] Patent Number: 4,661,293
[45] Date of Patent: Apr. 28, 1987

[54] METHOD FOR PREPARING 1,4-DIAMINOANTHRAQUINONES AND INTERMEDIATES THEREOF

[75] Inventor: Alfred G. Zielske, Pleasanton, Calif.

[73] Assignee: The Clorox Company, Oakland, Calif.

[21] Appl. No.: 868,884

[22] Filed: May 23, 1986

Related U.S. Application Data

[63] Continuation of Ser. No. 556,835, Dec. 1, 1983, abandoned.

[51] Int. Cl.$^4$ .................. C07C 97/24; C07C 103/82
[52] U.S. Cl. .................................. 260/377; 260/378; 260/379
[58] Field of Search ................. 260/378, 379, 377

[56] References Cited

U.S. PATENT DOCUMENTS

| | | | |
|---|---|---|---|
| 2,050,704 | 8/1936 | Koeberle et al. | |
| 2,121,928 | 6/1938 | Peter | 260/60 |
| 2,174,751 | 10/1939 | Koerberle | 260/367 |
| 2,183,652 | 12/1939 | Lord | 260/378 |
| 2,185,709 | 1/1940 | Ogilvie et al. | 260/378 |
| 2,188,369 | 1/1940 | McNally et al. | 260/371 |
| 2,191,029 | 2/1940 | McNally et al. | 8/40 |
| 2,191,030 | 2/1940 | McNally et al. | 8/40 |
| 2,211,943 | 8/1940 | Wilder | 260/378 |
| 2,727,025 | 12/1955 | Weitkamp | 260/96.5 |
| 4,457,855 | 7/1984 | Sudbury et al. | 252/98 |

FOREIGN PATENT DOCUMENTS 2014178 8/1979 United Kingdom .
2019870 11/1979 United Kingdom .
2100307A 5/1982 United Kingdom .

OTHER PUBLICATIONS

Morrison & Boyd, *Organic Chemistry* 3 ed, 1973, pp. 458, 456, 527 and 528.
Chemical Abstracts vol. 88, (Reference 88:10498g and 88:10498h) Schultz et al., "Synthesis of Meso-Substituted Hydroxyanthrones with Laxative Activity, Parts I and II".
Arch. Pharm., vol. 310, No. 10, pp. 769-780 (1977) (German).

*Primary Examiner*—Glennon H. Hollrah
*Assistant Examiner*—Raymond Covington
*Attorney, Agent, or Firm*—Majestic, Gallagher, Parsons & Siebert

[57] ABSTRACT

Aminoanthraquinones are generally useful as dyes and coloring agents. But known methods of synthesizing unsymmetrically substituted 1,4-diaminoanthraquinones are tedious and complex. A simple and efficient method is provided for preparing 1,4-diaminoanthraquinones, particularly unsymmetrically substituted 1,4-diaminoanthraquinones, by means of novel monoamino-monotosyl-anthraquinones.

8 Claims, No Drawings

METHOD FOR PREPARING 1,4-DIAMINOANTHRAQUINONES AND INTERMEDIATES THEREOF

This is a continuation of application Ser. No. 556,835, filed Dec. 1, 1983, now abandoned.

TECHNICAL FIELD

The present invention relates generally to a method for preparing 9,10-anthraquinones substituted at the 1,4-positions, and particularly to a method of preparing unsymmetrically substituted 1,4-diaminoanthraquinones by means of intermediate monoaminomonotosyl-anthraquinones.

BACKGROUND ART

Aminoanthraquinones are generally useful as dyes and coloring agents for the coloring of materials such as cellulose derivatives and for coloring artificial compositions such as oils, waxes, detergents, and granulated bleaches. For example, U.S. Pat. Nos. 2,050,704 (issued Aug. 11, 1936), 2,121,928 (issued June 28, 1938), 2,191,029 (issued Feb. 20, 1940), 2,191,030 (issued Feb. 20, 1940), and 2,188,369 (issued Jan. 30, 1940) all disclose substituted anthraquinone compounds and their uses as dyes. More recently, U.K. patent application Nos. 2,014,178 (published Aug. 22, 1979) and 2,019,870 (published Nov. 7, 1979) have disclosed a class of halogenoanthraquinones useful for dying and printing textile materials.

U.S. Pat. No. 2,121,928, issued to Peter, discloses a method of synthesizing substituted aminoanthraquinone compounds by condensing certain aromatic amines with halogen, sulpho-, or alkyl-substituted anthraquinone compounds at elevated temperatures in the presence of a catalyst.

U.S. Pat. No. 2,183,652, issued to Lord, discloses a method of synthesizing substituted aminoanthraquinone compounds by reacting quinizarin (1,4-dihydroxyanthraquinone), 1,4,5-trihydroxyanthraquinone or 1,4,5,8-tetrahydroxyanthraquinone with an aliphatic amine compound in a dilute aqueous caustic alkali solution and in the presence of a metal catalyst.

U.S. Pat. No. 2,188,369, issued to McNally, provides for syntheses of substituted 1,4-diaminoanthraquinones wherein the 1-amino group is N-substituted with an alkylene sulfonic acid group.

U.S. Pat. Nos. 2,050,704, 2,185,709, and 2,191,029, issued to Koeberle, Ogilvie, and McNally, respectively, disclose methods of synthesizing N-substituted 1,4-diaminoanthraquinones from leuco-1,4-diaminoanthraquinone compounds as starting materials.

U.K. patent application Nos. 2,014,178 and 2,019,870 describe methods of preparing unsymmetrically substituted 1,4-diaminoanthraquinone compounds halogenated at either the 6- or 7-positions.

Known methods of synthesizing unsymmetrical aminoanthraquinones for the most part comprise multistep, lengthy reactions. Methods given in the literature for synthesizing such compounds have been tedious and complex.

SUMMARY OF THE INVENTION

Accordingly, it is an object of the present invention to provide a simple and efficient method for preparing 1,4-diaminoanthraquinones, particularly unsymmetrically substituted 1,4-diaminoanthraquinones.

It is another object of the present invention to provide novel monoamino-monotosyl-anthraquinones which are useful as key intermediates in making 1,4-diaminoanthraquinone dyes.

Additional objects, advantages, and novel features of the invention will be set forth in part in the description which follows, and in part will become apparent to those skilled in the art on examination.

In one aspect of the present invention, a 9,10-anthraquinone is provided having a tosyl group and an amino group at the 1- and 4- positions thereof. Such a 9,10-anthraquinone having a tosyl and an amino substituent may be readily prepared and isolated in high yield by reacting a 1,4-ditosylanthraquinone with an excess of a primary or secondary, aliphatic amine at a mild temperature and in the presence of an organic solvent or by reacting a 1,4-ditosylanthraquinone with an excess of an aromatic amine at an elevated temperature in the presence of an organic solvent.

In another aspect of the present invention, unsymmetrically substituted 1,4-diaminoanthraquinones may be prepared via a monoamino-monotosyl-anthraquinone intermediate.

BEST MODE OF CARRYING OUT THE INVENTION

As is well known, the structure of 9,10-anthraquinone (hereinafter referred to as "anthraquinone") is as illustrated by Formula 1 below.

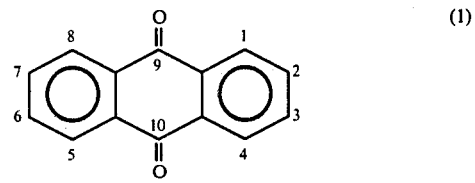

(1)

Conventional numbering of the anthraquinone molecule is also shown by Formula 1. Since the 8,5 positions are equivalent to the 1,4 positions for the 9,10-anthraquinone molecule, references hereinafter to the 1 and/or 4 positions can alternatively be read to mean the 8 and/or 5 positions.

Among the many known anthraquinone derivatives is 1,4-dihydroxyanthraquinone, or quinizarin, which is commercially available.

Quinizarin can be reacted with a suitable sulfonyl chloride, such as p-toluenesulfonate, to form a 1,4-ditosylanthraquinone. This aromatic tosylate is easily prepared at room temperature or with refluxing (40° C.) methylene chloride and triethylamine as shown by the reaction scheme illustrated in Reaction I below.

Reaction I

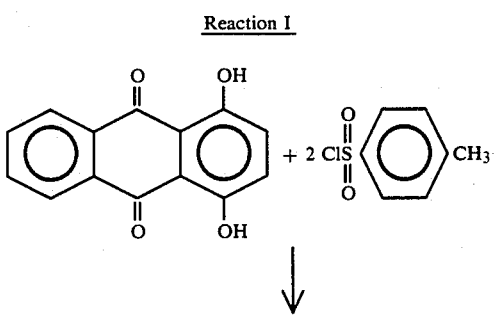

-continued
Reaction I

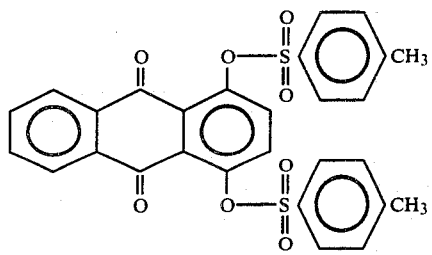

The 1,4-ditosylanthraquinone is stable, and may be stored at room temperature for long periods, with no apparent decomposition.

Example I below illustrates preparation of 1,4-ditosylanthraquinone.

EXAMPLE I

For preparation of 1,4-ditosylanthraquinone, to quinizarin (10.0 g, 41.7 mmole, Aldrich Chem. Co.) dissolved in methylene chloride (400 ml) was added triethylamine (24 ml, 170 mmole) and p-toluenesulfonyl chloride (16 g, 84 mmole). The solution was stirred for 24 hours at room temperature, washed with water and dried over anhydrous magnesium sulfate. The course of the reaction could be followed by TLC (silica gel, $CH_2Cl_2$). The methylene chloride was evaporated and the residue stirred with carbon tetrachloride (300 ml) at room temperature for 3 hours. Filtration of the slurry gave a bright yellow solid. The dried yellow solid (17.8 g) represented a yield of 78% and had m.p. 221°–225° C. (d). Material recrystallized from chloroform-petroleum ether had m.p. 225°–226° C. (d). Mass spectrum, m/e 548 (M+), 394 (M-$C_7H_7SO_2$+H), 239 (M-2$C_7H_7SO_2$+H), 155 ($C_7H_7SO_2$), 91 ($C_7H_7$); $^1$H-NMR ($CD_2Cl_2$) δ8.02–7.94 (m, 2H), 7.91–7.69 (m, 6H), 7.45 (s, 2H), 7.33–7.24 (m, 4H), 2.35 (s, 6H); IR (Nujol) 1335 cm$^{-1}$ 1310 (asymmetric $SO_2$ stretch), 1175 cm$^{-1}$, 1190 (symmetric $SO_2$ stretch), 920 cm$^{-1}$, 895, 860, 810, 795, 780, 745, (S—O—C stretch); UV/VIS max ($CH_2Cl_2$) 331 nm (ε4820).

Anal. Calcd. for $C_{28}H_{20}S_2O_8$: C,61.31; H, 3.65; S, 11.68. Found: C, 61.10; H, 3.81; S, 11.54.

As further described hereinafter, 1,4-ditosylanthraquinone is useful as a precursor, or starting material, in practicing the present invention, as are certain analogs thereof. For example, each of the

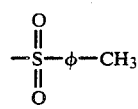

moieties of 1,4-ditosylanthraquinone may have a halo rather than the methyl substituent, such as

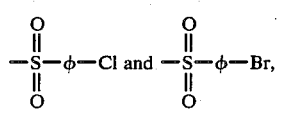

or may have a nitro rather than the methyl substituent, such as

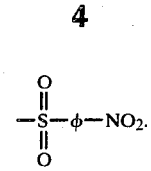

For convenience, and unless otherwise specified, the abbreviation "Ts" shall include not only the p-toluenesulfonate moiety (i.e., tosyl, or

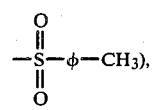

but also

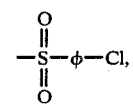

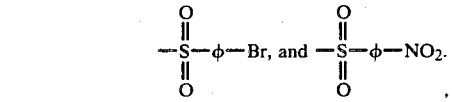

Novel intermediates in accordance with the present invention are readily prepared from 1,4-ditosylanthraquinone and its analogs by reaction with an excess of a primary or secondary aliphatic amine or an aromatic amine. With the correct solvent and temperature, it is possible to stop the reaction at this intermediate stage and to isolate the novel intermediates. With alkyl amines, relatively low temperatures and a non-polar organic solvent having a dielectric constant of between about 2 to about 10 at about 20° C., such as methylene chloride, carbon tetrachloride or chloroform, are appropriate reaction conditions, and will give a fairly high yield of the intermediate monoamino-monotosylanthraquinone compound. With aromatic amines, because of their poor nucleophilicity, it is preferred to use an organic solvent having a higher dielectric constant, such as DMSO or DMF as a solvent, and to use higher temperatures.

The intermediates produced have an amino group and a tosyl group substituted on one of the anthraquinone aromatic rings in a "para" relationship, i.e., on the 1 and 4 ring positions, respectively. The amino substituent of such an anthraquinone may be a primary, secondary or tertiary amino group. Novel anthraquinone intermediates (sometimes herein referred to as a monoamino-monotosyl-anthraquinones) have the structure shown by Formula II below.

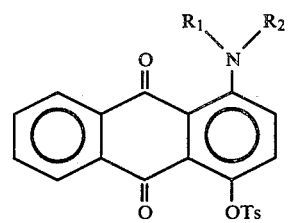

$R_1$ derives from a branched or unbranched acyclic hydrocarbon which may be either saturated or unsaturated (with one or more double bonds), or from a cycloalkyl or aryl group, with or without side chain substituents. R₂ moieties may be as described for R₁. Preferably, R₁ and R₂ are selected from hydrogen, alkyl, cycloalkyl or aryl, and particularly preferred moieties for R₁ and R₂ are —H, —CH(CH₃)₂, —CH₂CH₃, —(CH₂)₂CH₃, —(CH₂)₃CH₃, phenyl and 3,5-dimethylphenyl. The R₁ and R₂ moieties may be the same or different.

R₁ and/or R₂ may be, for example, methyl, ethyl, isopropyl, n-, sec- or tert-butyl, cyclohexyl, and trimethylcyclohexylamino. Further, where at least one of R₁ and R₂ is a phenyl substituent, the phenyl ring can be further mono- or poly-substituted with substituents such as acylamino, one or more alkyl groups generally having 1 to 4 carbons, alkoxy groups such as methoxy, ethoxy, and propoxy.

Suitable amines for introducing the R₁ and R₂ groups are for example: methylamine, ethylamine, isopropylamine and butylamine; phenylamine, 2-methylphenylamine, 4-methylphenylamine, 4-isopropylphenylamine, 2,4-dimethylphenylamine, 3,4-dimethylphenylamine, 2,5-dimethylphenylamine, 2-methyl-5-methoxyphenylamine, 2,3-dimethylphenylamine, 2,6-dimethylphenylamine, 2,4,6-trimethylphenylamine, 4-ethylphenylamine, 2-ethylphenylamine, 4-tert-butylphenylamine, 2-methoxyphenylamine, 2-ethoxyphenylamine, 4-methoxyphenylamine, 2,5-dimethoxyphenylamine, 4-butoxyphenylamine, 4-acetylaminophenylamine, 4-phenoxyphenylamine, 4-(4'-methyl)-phenoxyphenylamine, benzylamine and phenylisobutylamine; phenylcyclohexylamine; cyclohexylamine and 3,5,5-trimethylcyclohexylamine, as well as 4-cyclohexylphenylamine.

Where neither of the R₁ and R₂ moieties is aryl, the organic solvent in which the reaction is conducted is preferably methylene chloride, carbon tetrachloride, or chloroform, most preferably methylene chloride, and the mild or relatively low reaction temperature is preferably maintained at not greater than about 50° C.

Example II, below, illustrates the general method for preparing the novel monoamino-monotosylanthraquinones where neither of the R₁ and R₂ moieties is aryl. Examples III, IV and V give the yield, melting point and spectral data for particular compounds prepared in accordance with the general method illustrated by Example II.

EXAMPLE II

The 1,4-ditosylanthraquinone is dissolved in methylene chloride, the suitable primary or secondary alkyl amine added in excess and the solution refluxed from about 5 to 24 hours. The reaction can be followed by thin layer chromatography ("TLC") (such as silica gel, with hexane/ethyl acetate, 70:30). The starting material gives R$_f$ in the 0.40 region (dark spot under UV light), whereas the monoamino-monotosyl-anthraquinone is typically bright red, with R$_f$ usually in the 0.65 region, and there is sometimes a faint blue spot present at R$_f$ about 0.80 (a 1,4-bis-aminoanthraquinone). When reaction is complete, as judged by TLC, the liquids may be removed by evaporation, carbon tetrachloride added to the residue, and the slurry filtered. The red filtrate may be placed on a column of silica gel, the column eluted with hexane/ethyl acetate (70:30) and the red band collected. Further purification can be achieved, especially if any phenolic material (violet) is present, by chromatography through a short alumina column or by preparative TLC.

EXAMPLE III 1-(isopropylamino)-4-tosylanthraquinone was prepared by reaction of 1,4-ditosylanthraquinone with isopropyl amine. The isolated and purified reaction product has the structure illustrated below (where "Ts" is

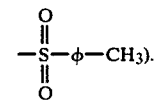

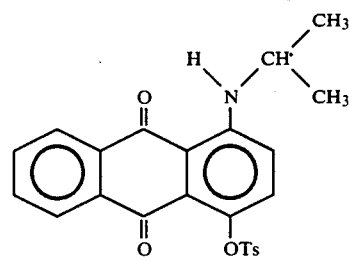

The yield was 76% and the m.p. 164°–165.5° C.; mass spec m/e 435 (M+), 420 (M-CH₃), 280 (M-C₇H₇SO₂), 238(280-C₃H₇+H), 210 (238-CO), 182 (210-CO), 155 (C₇H₇SO₂), 91 (C₇H₇); ¹H-NMR (CD₂Cl₂)δ9.97 (br s, 1H), 8.19–8.10 (m, 2H), 7.85–7.67 (m, 4H), 7.27–6.97 (m, 4H), 4.02–3.68 (m, 1H), 2.30 (s, 3H), 1.38, 1.31 (d, 6H); IR (Nujol) 1180 cm⁻¹ (symmetrical SO₂ stretch), 890 cm⁻¹, 860, 820, 780 (S—O—C stretch); UV/VIS max (Xylenes) 500 nm (ε6660).

Anal. Calcd. for C₂₄H₂₁NSO₅: C, 66.21; H, 4.83; N, 3.22; S, 7.36. Found: C, 66.35; H, 4.75; N, 3.25; S, 7.38.

EXAMPLE IV 1-(n-propylamino)-4-tosylanthraquinone was prepared by reaction of 1,4-ditosylanthraquinone with n-propyl amine. The isolated and purified reaction product has the structure illustrated below (where "Ts" is

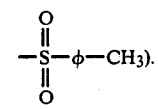

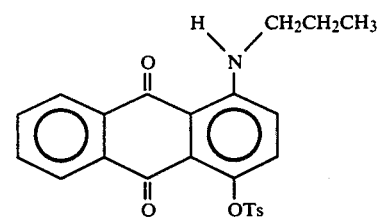

The yield was 73% and the m.p. 163°–164° C. Mass spec m/e 435 (M+), 406 (M-C₂H₅), 280 (M-C₇H₇SO₂), 252 (280-CO), 155 (C₇H₇SO₂), 91 (C₇H₇); ¹H-NMR (CD₂Cl₂)δ10.01 (br s, 1H), 8.21–7.87 (m, 2H), 7.81–7.65 (m, 4H), 7.35–6.96 (m, 4H), 3.41–3.20 (m, 2H), 2.31 (s, 3H), 1.91–1.67 (m,2H), 1.16–1.00 (t, 3H); IR (Nujol) 1368 cm⁻¹ (asymmetrical stretch), 1170 cm⁻¹ (symmetric stretch), 932, 898, 865, 830, 785 cm₋₁ (S—O—C stretch); UV/VIS max (Xylenes) 501 nm (ε6380).

Anal. Calcd. for C₂₄H₂₁NSO₅: C, 66.21; H, 4.83; H, 3.22; S, 7.36. Found: C, 66.03; H, 4.83; N, 3.20; S, 7.51.

EXAMPLE V 1-(diethylamino)-4-tosylanthraquinone was prepared by reaction of 1,4-ditosylanthraquinone with diethyl amine. The isolated and purified reaction product has the structure illustrated below (where "Ts" is

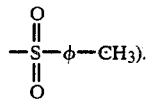

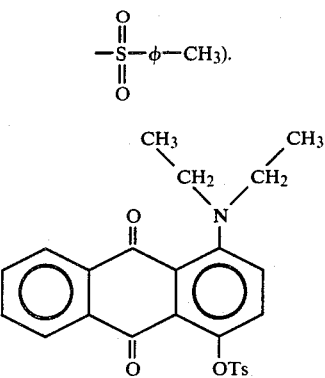

The yield was 91% and the m.p. 140°-141° C. Mass spec m/e 449 (M+), 434 (M-CH$_3$), 420 (M-C$_2$H$_5$), 294 (M-C$_7$H$_7$SO$_2$), 266 (294-CO), 155 (C$_7$H$_7$SO$_2$), 91 (C$_7$H$_7$): H-NMR (CD$_2$Cl$_2$)δ8.19–8.13 (m, 2H), 7.97–7.68 (m, 4H), 7.30–7.15 (m, 4H), 3.48–3.24 (q, 4H), 2.26 (s, 3H), 1.22–1.06 (t, 6H); IR (Nujol) 1172 cm$^{-1}$ (symmetrical SO$_2$ stretch), 945 cm$^{-1}$, 872, 830, 820, 800, 785, 765 (S—O—C stretch); UV/VIS max (Xylenes) 506 nm (ε3650).

Anal. Calcd. for C$_{25}$H$_{23}$NSO$_5$: C, 66.82; H, 5.12; N, 3.12; S, 7.13. Found: C, 66.86 H, 5.08; N, 3.04; S, 7.00.

Example VI, below, illustrates the general method for preparing the novel monoamino-monotosylanthraquinones where one or both of the R$_1$ and R$_2$ moieties is aryl. Example VII gives the yield, melting point and spectral data for a particular compound prepared in accordance with the general method illustrated by Example VI.

EXAMPLE VI

Where at least one of R$_1$ and R$_2$ is aryl, then the organic solvent is preferably dimethylsulfoxide (DMSO) or dimethylformamide (DMF), and the reaction mixture is heated, most preferably to a temperature of not greater than about 150° C. The reaction, as already described, may be followed by TLC. When complete the solution may be cooled, poured into 10% aqueous HCl, extracted with methylene chloride, and the methylene chloride layer washed with water and dried over anhydrous magnesium sulfate. After filtration, the solvent may be evaporated and the residue dissolved in carbon tetrachloride. Further purification may be as already described in Example II above.

EXAMPLE VII 1-(anilino)-4-tosylanthraquinone was prepared by reaction of 1,4-ditosylanthraquinone with aniline. The isolated and purified reaction product has the structure illustrated below (where "Ts" is

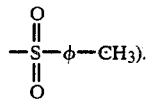

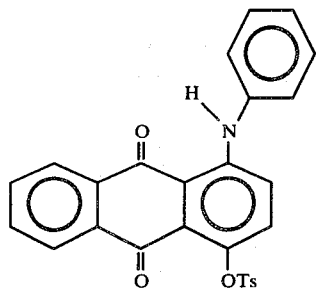

The yield was 79% and the m.p. 185°-186° C. Mass spec m/e 469 (M+), 314 (M-C$_7$H$_7$SO$_2$), 155 (C$_7$H$_7$SO$_2$), 91 (C$_7$H$_7$); H-NMR (CD$_2$Cl$_2$)δ11.50 (br s, 1H), 8.26–8.12 (m, 2H), 8.02–7.84 (m, 2H), 7.79–7.62 (m, 4H), 7.54–7.13 (m, 7H), 2.31 (s, 3H); IR (Nujol) 1355 cm$^{-1}$ (asymmetric SO$_2$ stretch), 1184 cm$^{-1}$ (symmetrical SO$_2$ stretch), 945 cm$^{-1}$, 872, 840, 822, 810, 800, 788, 755 (S—O—C stretch); UV/VIS max (Xylenes) 500 nm (ε7000).

Anal Calcd. for C$_{27}$H$_{19}$NSO$_5$: C, 69.08; H, 4.05; N, 2.98; S, 6.82. Found: C, 68.82; H, 4.11; N, 2.85; S, 7.04.

The monoamino-monotosyl-anthraquinone intermediates in accordance with the present invention may be used in a novel process to synthesize either symmetrical or unsymmetrical 1,4-diaminoanthraquinones. Broadly, the particular monoamino-monotosyl-anthraquinone intermediate which is chosen is reacted with either an alkyl or an aromatic amine, preferably in an organic solvent with a higher dielectric constant than 10 for an alkyl amine, such as pyridine at approximately 100° C., and preferably in DMSO at about 180° C. for an aromatic amine, as is illustrated in Reaction II below.

Reaction II

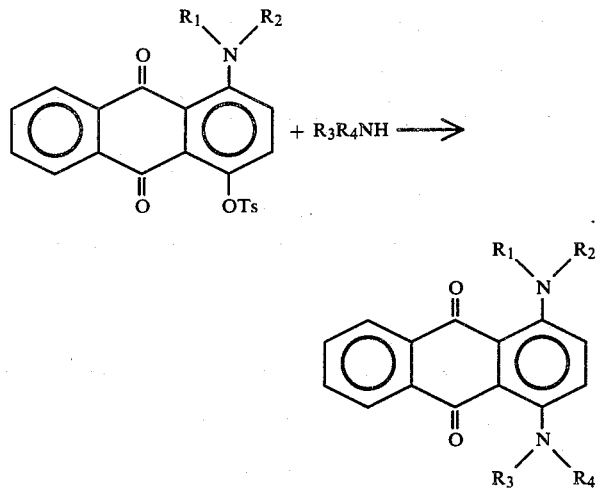

More particularly, the monoamino-monotosylanthraquinone compound chosen is dissolved in the appropriate solvent, an excess of the suitable primary or secondary alkyl amine is added, and the solution is heated from about 3 to 24 hours. The reaction may be followed by TLC (silica gel, hexanes/ethyl acetate, 90:10). The final 1,4-diaminoanthraquinone compound gives a bright blue spot with a relatively high R$_f$, in the 0.65 region.

Where neither the R$_3$ nor the R$_4$ substituents is aryl, the solvent used is pyridine or methylene chloride, preferably pyridine, and the reaction mixture is heated at a temperature preferably of about 100° C. When the reaction is complete, the solution may be cooled, poured into 10% aqueous HCl, and extracted with methylene chloride. The methylene chloride layer is washed with water and dried over anhydrous magnesium sulfate. Further purification may again be achieved by silica gel chromatography followed by final purification through a short alumina column or by preparative TLC. The diaminoanthraquinone products may be recrystallized by dissolving in ethanol, adding a small amount of water to the hot solution, and then cooling.

Where at least one of $R_3$ and $R_4$ is aryl, the preferable solvent is DMSO. The procedure followed is substantially the same as that for alkyl N-substituents, except that a higher temperature is required, preferably a temperature of from about 150° C. to about 180° C.

Suitable amines for introducing the $R_3$ and $R_4$ groups are as previously given for the $R_1$ and $R_2$ groups.

Example VIII, below, illustrates the general method for preparing symmetrical or unsymmetrical 1,4-diaminoanthraquinones from monoamino-monotosylanthraquinone intermediates, where neither the $R_3$ nor the $R_4$ substituents is to be aryl, and Examples IX and X give the yield, melting point and spectral data for particular compounds prepared in accordance with the general method illustrated by Example VIII.

EXAMPLE VIII

The selected 1-(amino)-4-tosylanthraquinone is dissolved in pyridine, the appropriate amine (about 800 molar excess) added, and the solution heated between 60°–100° C. for 3–24 hours. The reaction is conveniently followed by TLC (silica gel, hexanes/ethyl acetate, 90:10). The starting material gives a red spot ($R_f$ about 0.20) and the product gives a blue spot ($R_f$ about 0.65). When reaction is complete as judged by TLC, liquids are removed by evaporation, carbon tetrachloride added to the residue and the slurry filtered. The blue filtrate is placed on a column of silica gel, the column eluted with hexanes/ethyl acetate (90:10) and the blue band collected. Further purification can be achieved, especially if any phenolic material (violet) is present, by chromatography through a short alumina column or by preparative TLC. The compounds can be recrystallized by dissolving in ethanol, adding a small amount of water to the hot solution, and then cooling.

EXAMPLE IX 1-(isopropylamino)-4-(n-propylamino)anthraquinone was prepared by reaction of 1-(isopropylamino)-4-tosylanthraquinone with n-propyl amine. The isolated and purified reaction product has the structure illustrated below.

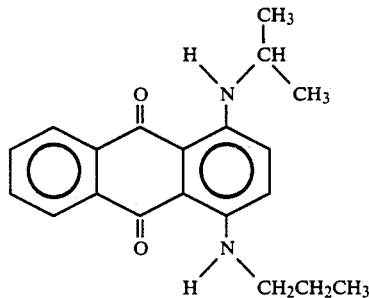

The yield was 67% and the m.p. 120°–121° C. Mass spec m/e 322 (M+), 307 (M-CH₃), 293 (M-C₂H₅), 279 (307-CO), 251 (M-2CO); ¹H-NMR (CD₂Cl₂)δ10.99 (br s, 1H), 10.88 (br s, 1H), 8.39–8.22 (m, 2H); 7.77–7.59 (m,2H), 7.27 (s, 2H), 3.90 (m, 1H), 3.46–3.28 (m, 2H), 1.81–1.58 (m, 2H), 1.39, 1.32 (d, 6H), 1.26–1.07 (t, 3H); VIS max (Xylenes) 598 nm (ε14 100), 646 (16 200).

Anal. Calcd. for $C_{20}H_{22}N_2O_2$: C, 74.53; H, 6.83; N, 8.70. Found: C, 74.55; H, 6.92; N, 8.80.

EXAMPLE X 1-(anilino)-4-(n-butylamino)-anthraquinone was prepared by reaction of 1-(anilino)-4-tosylanthraquinone with n-butylamine. The isolated and purified reaction product has the structure illustrated below.

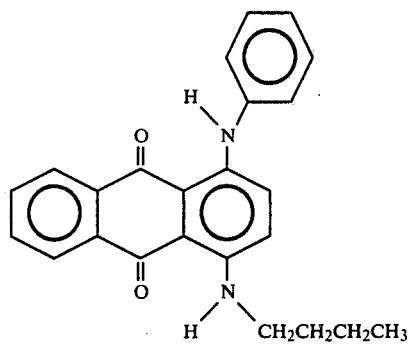

The yield was 90% and m.p. 118°–120° C. Mass spectrum, m/e 370 (M+), 327 (M-C₃H₇), 299 (327-CO); ¹H-NMR (CD₂Cl₂)δ12.17 (br s, 1H), 10.78 (br s, 1H), 8.37–8.27 (m, 2H) 7.76–7.39 (m, 4H), 7.33–7.10 (m, 5H), 3.65–3.05 (m, 2H), 1.72–1.38 (m, 4H), 1.07–0.92 (t, 3H); UV/VIS max (Xylenes) 388 nm (ε4000), 598 (14 200), 642 (15 600).

Anal. Calcd. for $C_{24}H_{22}N_2O_2$: C, 77.84; H, 5.94; N. 7.57 Found: C, 77.68; H, 5.94, N, 7.41.

Example XI, below, illustrates the general method for preparing symmetrical or unsymmetrical 1,4-diaminoanthraquinones where one (or both) of the $R_3$ and $R_4$ substituents is aryl, and Example XII gives the yield, melting point and spectral data for a particular compound so prepared.

EXAMPLE XI

The 1-(arylamino)-4-tosylanthraquinone is dissolved in DMSO, the appropriate aromatic amine added (about 2000 molar excess), and the solution heated at 180° C. for 3 hours. The reaction is followed by TLC as described by Example VIII. When reaction is complete, the solution is cooled, poured into 10% aqueous HCl, extracted with methylene chloride, the methylene chloride layer washed with water, and dried over anhydrous magnesium sulfate. After filtration, the solvent was evaporated and the residue dissolved in carbon tetrachloride. Purification proceeds as described by Example VIII above.

EXAMPLE XII 1-anilino-4-(3,5-dimethylanilino)anthraquinone was prepared by reaction of 3,5-dimethylaniline with 1-(anilino)-4-tosylanthraquinone. The isolated and purified reaction product has the structure illustrated below.

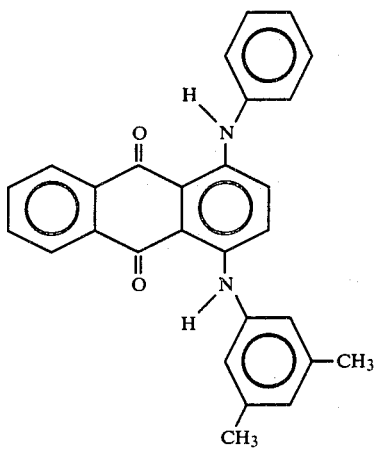

The yield was 56% and m.p. 219.5°–220.5° C. Mass spectrum, m/e 418 (M+); H-NMR (CD$_2$Cl$_2$)δ12.20 (br s, 2H), 8.41–8.30 (m, 2H) 7.80–7.69 (m, 2H), 7.52–7.34 (m, 7H), 6.90 (br s, 3H), 2.32 (s, 6H); UV/VIS max (Xylenes) 404 nm (ε6 600), 600 (13 400), 641 (14 400).

Anal. Calcd. for C$_{28}$H$_{22}$N$_2$O$_2$: C, 80.38; H, 5.26; N, 6.70. Found: C, 80.11; H, 5.14; N, 6.54.

Where one wishes to prepare a symmetrical 1,4-diamonoanthraquinone, it is typically simpler to proceed from the 1,4-ditosylanthraquinone to the particular 1,4-diaminoanthraquinone desired without isolating any monoamino-monotosyl-anthraquinone intermediate. Example XIII, below, illustrates the preparation of 1,4-bis-(n-butylamino)-anthraquinone.

EXAMPLE XIII 1,4-bis-(n-butylamino)-anthraquinone having the structure illustrated below was prepared by reaction of 1,4-ditosylanthraquinone with n-butyl amine in pyridine at 100° C.

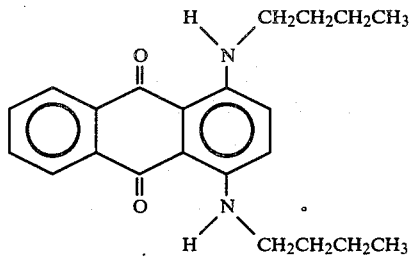

The yield was 68% and m.p. 120°–121° C. Mass spectrum m/e 350 (M+), 307 (M-C$_3$H$_7$); H-NMR (CD$_2$Cl$_2$)δ10.76 (br s, 2H), 8.34–8.19 (m, 2H), 7.74–7.57 (m, 2H), 7.20 (s, 2H), 3.48–3.27 (m, 4H), 1.88–1.30 (m, 8H), 1.06–0.91 (t, 6H); VIS max (Xylenes) 600 nm (ε15 000), 648 (17 300).

Anal Calcd. for C$_{22}$H$_{26}$N$_2$O$_2$: C, 75.43; H, 7.43; N, 8.00. Found: C, 75.50; H, 7.42; N, 7.84.

The foregoing examples illustrate certain embodiments of the present invention, and are not intended to limit the scope of the invention which is defined in the appended claims.

I claim:

1. A method of preparing an unsymmetrical 1,4-diaminoanthraquinone comprising:
   providing a monoamino-monotosyl-anthraquinone having the structure

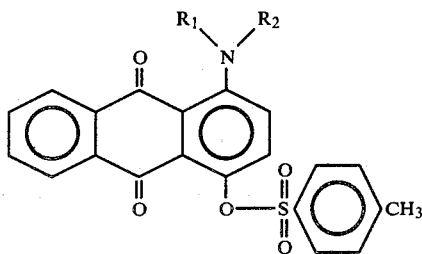

wherein R$_1$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, and R$_2$ is hydrogen, alkyl, cycloalkyl or aryl, the alkyl haaving 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, reacting said monoamino-monotosyl-anthraquinone with an excess of a primary or secondary amine in the presence of an organic solvent at an elevated temperature to form an unsymmetrical 1,4-diaminoanthraquinone, said amine having the formula R$_3$R$_4$NH wherein R$_3$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, and R$_4$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, when R$_3$ and R$_4$ are hydrogen, alkyl or cycloalkyl the organic solvent being pyridine, and when at least one of R$_3$ and R$_4$ is aryl the organic solvent being dimethyl sulfoxide or dimethyl formamide.

2. The method as in claim 1 wherein the reaction product has the structure

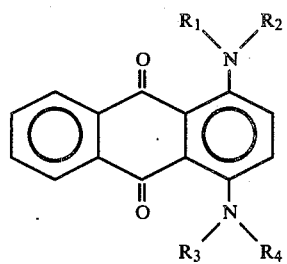

wherein one of $R_1$ and $R_2$ is hydrogen and the other is hydrogen, alkyl, cycloakyl or aryl as defined in claim 1, one of $R_3$ and $R_4$ is hydrogen and the other is hydrogen, alkyl, cycloalkyl or aryl, as defined in claim 11, and the —$NR_1R_2$ moiety of the reaction product is different than the —$NR_3R_4$ moiety of the reaction product.

3. The method as in claim 2 furthr comprising:
monitoring formation of the reaction product by thin layer chromatography.

4. The method as in claim 1 or 2 wherein the elevated temperature is between about 60° to about 100° C. when the organic solvent is pyridine, is about 150° C. when the solvent is dimethyl formamide, and is between about 150° C. to about 180° C. when the solvent is dimethyl sulfoxide.

5. A method for preparing an unsymmetrical 1,4-diaminoanthraquinone comprising:
providing a first compound having the structure

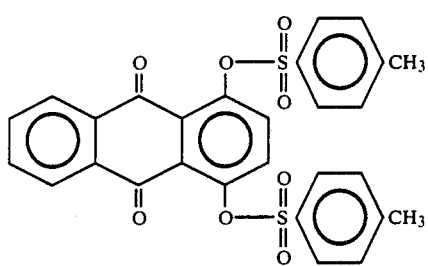

reacting said first compound with an excess of a first primary or secondary amine to form an intermediate reaction product, said first amine having the formula $R_1R_2NH$ wherein $R_1$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, and $R_2$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, the reacting being in the presence of a first organic solvent, when neither of $R_1$ and $R_2$ is aryl the first organic solvent being methylene chloride, carbon tetrachloride or chloroform and when at least one of $R_1$ and $R_2$ is aryl the first organic solvent being dimethyl sulfoxide or dimethyl formamide;
admixing said intermediate reaction product with a second primary or secondary amine in the presence of a second organic solvent, said second amine having the formula $R_3R_4NH$, wherein $R_3$ is hydrogen, alkyl cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, $R_4$ is hydrogen, alkyl, cycloalkyl or aryl, the alkyl having 1 to about 4 carbons, the cycloalkyl having about 6 to about 9 carbons, the aryl being unsubstituted or substituted phenyl or benzyl, the substituent thereof being one or more of an alkyl group having 1 to about 4 carbons, an alkoxy group having 1 to about 3 carbons, a cyclohexyl group, a phenoxy group, or an acylamino group, said second organic solvent being pyridine when $R_3$ and $R_4$ are hydrogen, alkyl or cycloalkyl and being dimethyl sulfoxide when either $R_3$ or $R_4$ is aryl, and wherein said first and said second amines are different; and
heating the admixture to between about 60° to about 100° C. when said second organic solvent is pyridine and to between about 150° C. to about 180° C. when said second organic solvent is dimethyl sulfoxide to form a 1,4-diaminoanthraquinone reaction product having the structure

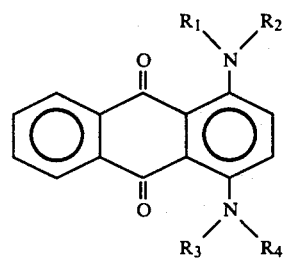

where the —$NR_1R_2$ moiety is different than the —$NR_3R_4$ moiety.

6. The method as in claim 5 further comprising:
maintaining a reaction temperature during the reacting of the first compound and the first primary or secondary amine at not greater than about 50° C. when $R_1$ and $R_2$ are hydrogen, alkyl or cycloalkyl as defined in claim 5 and at not greater than about 150° C. when at least one of $R_1$ and $R_2$ is aryl as defined in claim 5.

7. The method as in claim 5 or 6 further comprising:
isolating said intermediate reaction product from said first primary or secondary amine.

8. The method as in claim 7 wherein the isolating includes separating said intermediate reaction product by column chromatography.

* * * * *

UNITED STATES PATENT AND TRADEMARK OFFICE
CERTIFICATE OF CORRECTION

PATENT NO.  : 4,661,293

DATED       : April 28, 1987

INVENTOR(S) : Zielske

It is certified that error appears in the above-identified patent and that said Letters Patent is hereby corrected as shown below:

Col. 12, line 22: "haaving" should be --having--;
Col. 13, line 4:  "claim 11" should be --claim 1--;
Col. 13, line 7:  "furthr" should be --further--; and
Col. 14, line 3:  insert --,-- between "alkyl" and "cycloalkyl".

Signed and Sealed this

Tenth Day of May, 1988

Attest:

DONALD J. QUIGG

*Attesting Officer*      Commissioner of Patents and Trademarks